United States Patent
Huang

(10) Patent No.: US 6,641,116 B1
(45) Date of Patent: Nov. 4, 2003

(54) STRAP FASTENER

(76) Inventor: Han-Ching Huang, No. 12, Alley 111, Lane 437, Chen Hsing Road, Taichung (TW)

( * ) Notice: Subject to any disclaimer, the term of this patent is extended or adjusted under 35 U.S.C. 154(b) by 0 days.

(21) Appl. No.: 10/289,565

(22) Filed: Nov. 8, 2002

(51) Int. Cl.$^7$ ............. B21F 9/00; B25B 25/00; B66F 3/00
(52) U.S. Cl. ............. 254/218; 254/223; 254/247; 24/68 CD; 24/68 R
(58) Field of Search ............. 254/217, 218, 254/222, 223, 237, 245–247, 256, 257; 24/28 CD, 68 R, 70 ST, 69 ST, 69 TS, 71 R, 71 ST

(56) References Cited

U.S. PATENT DOCUMENTS

| | | | | |
|---|---|---|---|---|
| 5,271,606 A | * | 12/1993 | Kamper | 254/217 |
| 5,282,296 A | * | 2/1994 | Huang | 24/68 CD |
| 5,855,045 A | * | 1/1999 | Miura | 24/68 CD |
| 6,007,053 A | * | 12/1999 | Huang | 254/247 |

* cited by examiner

Primary Examiner—Emmanuel M. Marcelo
(74) Attorney, Agent, or Firm—Charles E. Baxley

(57) ABSTRACT

A strap fastener includes a base, a shaft mounted on the base, a reel rotationally mounted on the shaft, two ratchet wheels formed on the reel, a torque spring arranged between the reel and the shaft, a lever pivotally mounted on the base, a first detent movably mounted on the lever for engagement with the ratchet wheels, a second detent movably mounted on the base for engagement with the ratchet wheels, a wedge formed on the second spring-biased detent, a handle including a first end in which a hole is defined, a second end secured to the lever and a control element extending through the handle and the lever and including a first end exposed through the hole defined in the first end of the handle and a second end in engagement with the wedge. The first end of the control element can be pressed so as to move the second end of the control element from a position for engaging the second detent with the ratchet wheels to a second position for disengaging the second detent from the ratchet wheels.

4 Claims, 5 Drawing Sheets

STRAP FASTENER

BACKGROUND OF INVENTION

1. Field of Invention

The present invention is related to a strap fastener and, more particularly, to a strap fastener for use in boats.

2. Related Prior Art

In Taiwanese Patent Publication No. 361404 issued to the applicant of the present application, a strap fastener for use in boats is disclosed. This conventional strap fastener includes a base 10 and a reel 20 rotationally mounted on the base 10. A strap 21 is secured to and can be wound on the reel 20. Two ratchet wheels 22 are formed on the reel 20 so that the strap 21 is located between the ratchet wheels 22. A first lever 40 is pivotally mounted on the base 10. Movably mounted on the first lever 40 is a first detent 50 for engagement with the ratchet wheels 22. Two springs 521 are compressed between the first detent 50 and a stop 43 extending from the first lever 40 for biasing the first detent 50 into engagement with the ratchet wheels 22. Thus, pivotal motion of the first lever 40 in a first direction relative to the base 10 causes rotation of the reel 20 in the first direction relative to the base 10 for tensioning the strap 21. On the contrary, pivotal motion of the first lever 40 in a second direction (opposite to the first direction) relative to the base 10 does not cause rotation of the reel 20 in the second direction relative to the base 10. Movably and rotationally mounted on the base 10 is a second detent 60 for engagement with the ratchet wheels 22. The second detent 60 is connected with the first lever 40 through a spring 421 for biasing the second detent 60 into engagement with the ratchet wheels 22. Thus, the second detent 60 retains the ratchet wheels 22 in position when the first lever 40 is in pivotal motion in the second direction relative to the base 10. A second lever 70 is connected with the second detent 60. Operation of the second lever 70 can disengage the second detent 60 from the ratchet wheels 22, thus allowing rotation of the reel 20 in the second direction relative to the base 10 and therefore slackening of the strap 21. In use of this conventional strap fastener, a user can be bothered by two problems. Firstly, the user may suffer from great pain in his fingers due to pressure because he has to press the first lever 40 with his fingers. Secondly, the user may get hurt due to sudden slackening of the strap 21 as a result of operation of the second lever 70 by mistake during operation of the first lever 40 because the second lever 70 is located very closed to the first lever 40.

The present invention is therefore intended to obviate or at least alleviate the problems encountered in prior art.

SUMMARY OF INVENTION

It is an objective of the present invention to provide a strap fastener that a user can easily and comfortably operate.

It is another objective of this invention to provide a strap fastener minimizing the risk of accidental slackening of a strap.

In the present invention, a strap fastener includes a base, a shaft mounted on the base, a reel rotationally mounted on the shaft, two ratchet wheels formed on the reel, a torque spring arranged between the reel and the shaft, a lever pivotally mounted on the base, a first detent movably mounted on the lever for engagement with the ratchet wheels, a second detent movably mounted on the base for engagement with the ratchet wheels, a wedge formed on the second spring-biased detent, a handle including a first end in which a hole is defined, a second end secured to the lever and a control element extending through the handle and the lever and including a first end exposed through the hole defined in the first end of the handle and a second end in engagement with the wedge. The first end of the control element can be pressed so as to move the second end of the control element from a position for engaging the second detent with the ratchet wheels to a second position for disengaging the second detent from the ratchet wheels.

Other objects, advantages, and novel features of the invention will become more apparent from the following detailed description when taken in conjunction with the accompanying drawings.

BRIEF DESCRIPTION OF DRAWINGS

The present invention will be described through detailed illustration of embodiments referring to the attached drawings.

DETAILED DESCRIPTION OF PREFERRED EMBODIMENT

Figure 1:
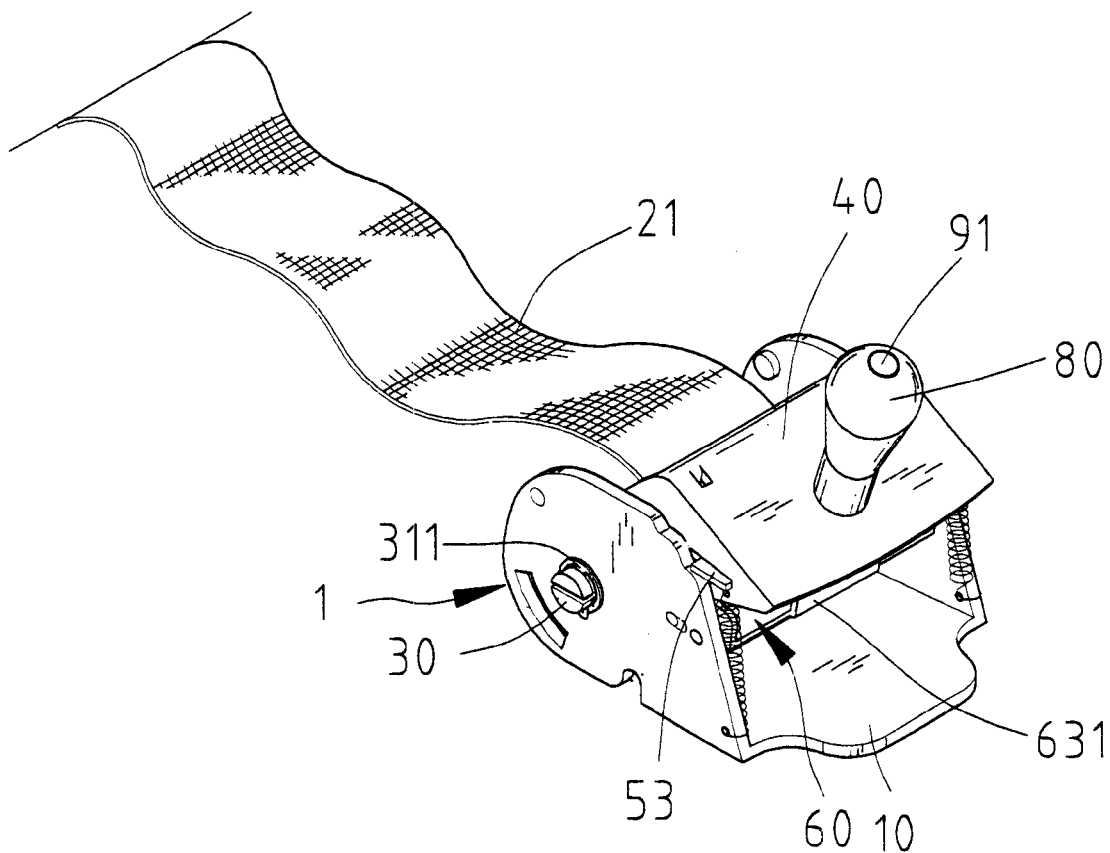
FIG. 1 is a perspective view of a strap fastener according to the preferred embodiment of the present invention.
Figure 2:
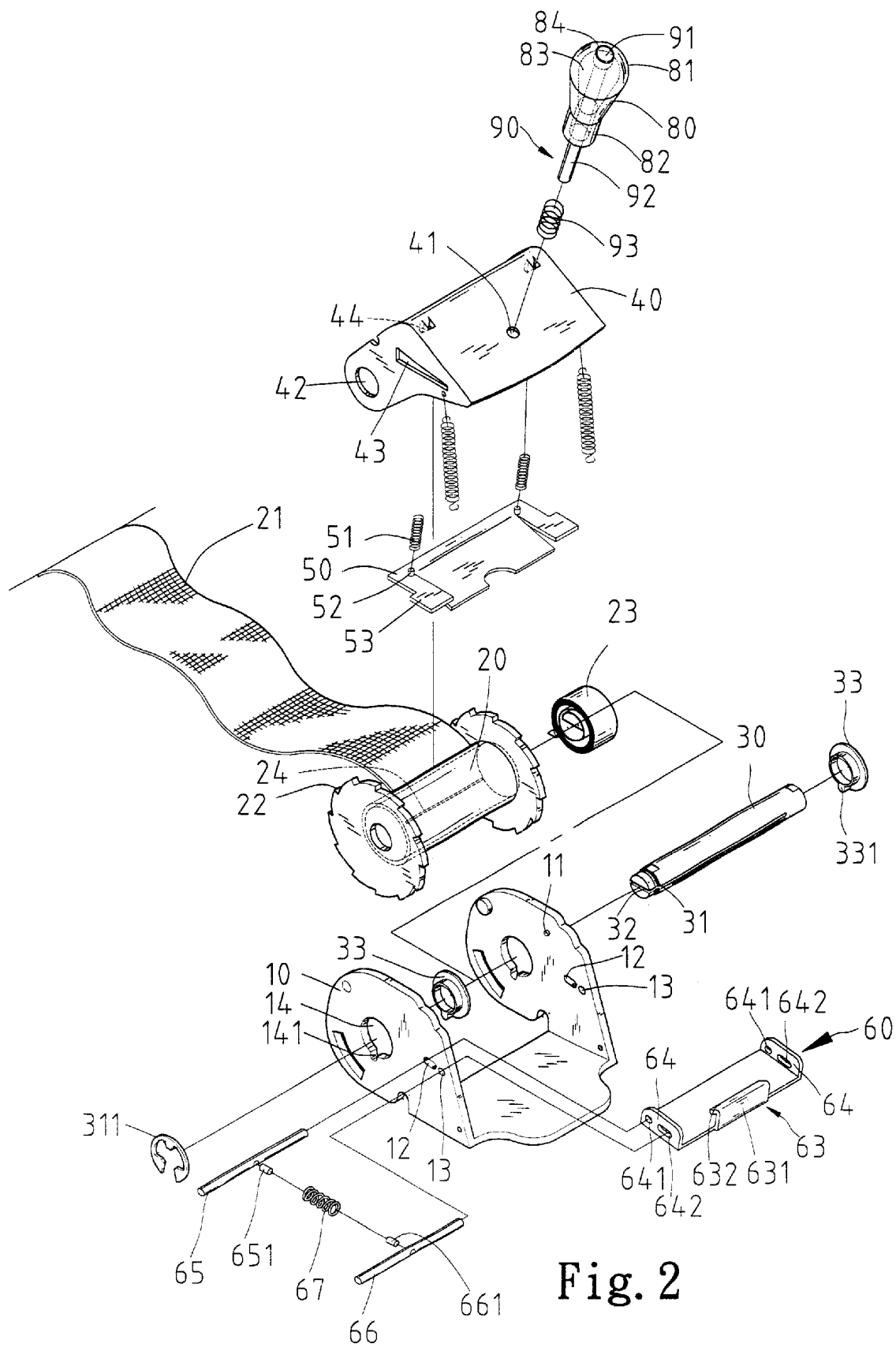
FIG. 2 is an exploded view of the strap fastener of FIG. 1.

Referring to FIGS. 1 and 2, according to the preferred embodiment of the present invention, a strap fastener includes a base 10, a shaft 30 mounted on the base 10, a reel 20 rotationally mounted on the shaft 30, two ratchet wheels 22 formed on the reel 20, a lever 40 pivotally mounted on the base 10, a first detent 50 movably mounted on the lever 40 for engagement with the ratchet wheels 22, a second detent 60 movably mounted on the base 10 for engagement with the ratchet wheels 22.

The base 10 includes two side plates (not numbered) and an intermediate plate (not numbered) formed between the side plates. Each of the side plates is formed with a boss 11 on a side. The bosses 11 face each other. A slot 12, a first hole 13 and a second hole 14 are defined in each of the side plates. A recess 141 is defined in each of the side plates so that the recess 141 is communicated with the second hole 14.

The shaft 30 includes a first end, a second end, an annular groove 31 defined therein near the first end and a slit 32 extending from the first end toward to the second end. A coil spring 23 includes an internal end and an external end. Each of two annular gaskets 33 includes an extension 331 formed thereon.

In assembly, the reel 20 is located between the side plates of the base 10. The coil spring 23 is received in the reel 20.

The external end of the coil spring 23 is received in a groove 24 defined in an internal periphery of the reel 20. The first end of the shaft 30 is inserted through the hole 14 defined in one of the side plates of the base 10 into the reel 20. The internal end of the coil spring 23 is received in the slit 32. The first end of the shaft 30 is then inserted through the hole 14 defined in the other one of the side plates of the base 10. Each of the ends of the shaft 30 is received in the hole 14 defined in each of the side plates of the base 10. Each of the annular gaskets 33 is forced into the second hole 14 defined in each of the side plates of the base 10 and onto each of the ends of the shaft 30. The extension 331 of each of the annular gaskets 33 is received receipt in the recess 141 defined in each of-the side plates of the base 10. Thus, the shaft 30 is mounted on the base 10 in an irrational manner. A C-clip 311 is received in the annular groove 31 defined in the periphery of the shaft 30 for retaining the shaft 30 on the base 10.

The lever 40 includes two side plates (not numbered) and an -intermediate plate (not numbered) formed between the side plates. A hole 41 is defined in the intermediate plate of the lever 40. Each of the side plates of the lever 40 defines a hole 42 and a slot 43. The shaft 30 is inserted in the holes 42 so that the lever 40 is pivotally mounted on the base 10.

The first detent 50 includes two fins 53 respectively extending from two opposite edges. Each of the fins 53 is inserted in one of the slits 43 so that the first detent 50 is movably mounted on the lever 40. Two springs 51 are compressed between the lever 40 and the first detent 50. Each of the springs 51 includes an end mounted on a protrusion 44 extending from the lever 40 and an opposite end mounted on a boss 52 formed on the first detent 50.

The second detent 60 includes an edge (not numbered) for engagement with the ratchet wheels 22 and an opposite edge (not numbered) at which a wedge 63 is formed. The wedge 63 is shaped a hook, i.e., includes an upright portion 631 being upright relative to the second detent 60 and an inclined portion 632 being inclined relative to the second detent 60. The second detent 60 includes two side plates 64 and an intermediate plate (not numbered) formed between the side plates 64. Each of the side plates 64 defines a hole 641 and a slot 642. A beam 65 is inserted in the slots 12 and the holes 641. A beam 66 is inserted the holes 13 and the slots 642. Thus, the second detent 60 is movably mounted on the base 10. A spring 67 includes an end mounted on a pin 651 fit in a hole defined in the beam 65 and an opposite end mounted on a pin 661 fit in a hole defined in the beam 66. Thus, the spring 67 tends to bias the second detent 60 into engagement with the ratchet wheels 22.

A control stick 90 is formed with an upper end 91, a lower end 92 and an enlarged portion 94 near the upper end 91. The lower end 92 is inserted through the hole 41 for engagement with the inclined portion 632 of the wedge 63. A spring 93 is mounted on the control stick 90 from the upper end 91.

A handle 80 includes an upper end 81 and a lower end 82 secured to the lever 40 via soldering, for example. The handle 80 is hollow for receiving the control stick 90 and the spring 93. The spring 93 is compressed between a portion of an internal face of the handle 80 and the enlarged portion 94 of the control stick 90. The control stick 90 is received in the handle 80 due to the enlarged portion 94 thereof abutting against a portion of the internal face of the handle 80. The first end 91 of the control stick 90 is received in a hole 84 defined in the upper end 81 of the handle 80. The first end 91 is taken as a button.

Figure 3:
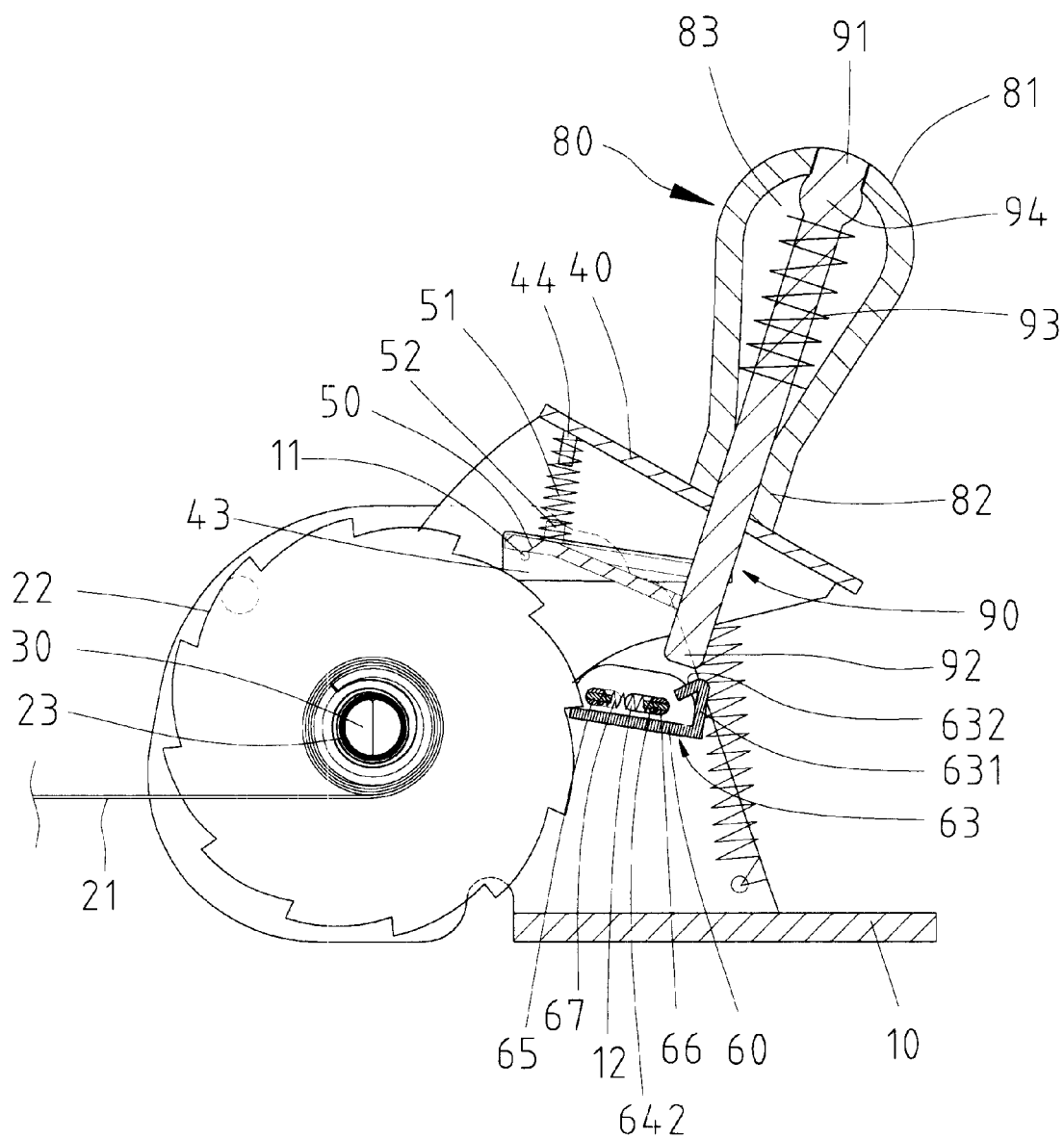
FIG. 3 is a cross-sectional view of the strap fastener of FIG. 1.

Referring to FIG. 3, the first detent 50 is restricted by the bosses 11 formed on the side plates of the base 10. Thus, the ratchet wheels 22 are kept from the first detent 50. The ratchet wheels 22 are engaged with the second detent 60. Thus, the reel 20 is retained in position.

Figure 4:
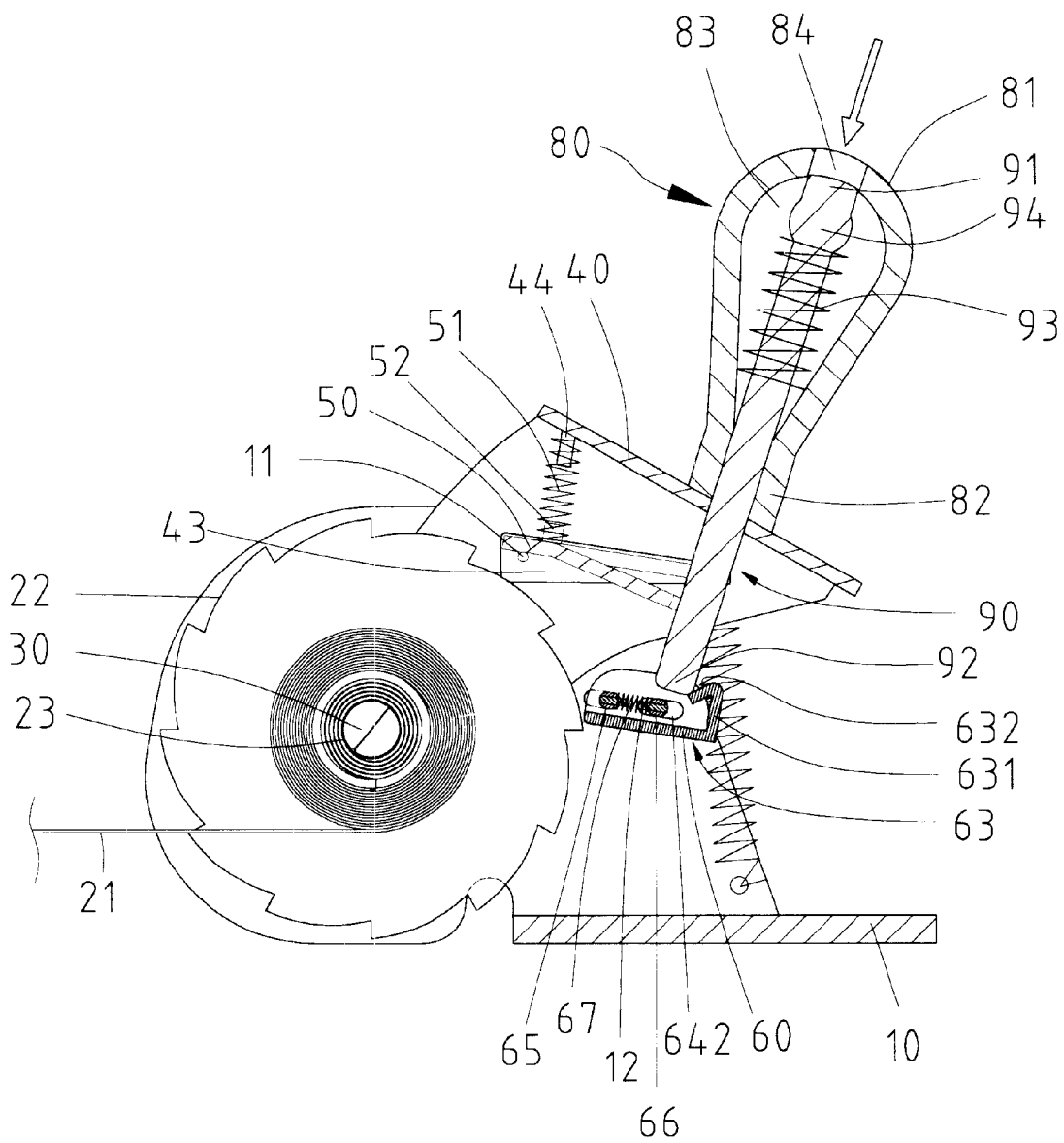
FIG. 4 is similar to FIG. 3 but showing the strap fastener in a second position.

Referring to FIG. 4, the upper end 91 of the control stick 90 is pressed so that the lower end 92 of the control stick 90 pushes the inclined portion 632 of the wedge 63. Thus, the second detent 60 is disengaged from the ratchet wheels 22 so as to allow rotation of the reel 20. Biased by the spring 23, the reel 20 rotates so as to wind the strap 21. On the contrary, the strap 21 can be unwound from the reel 20.

Figure 5:
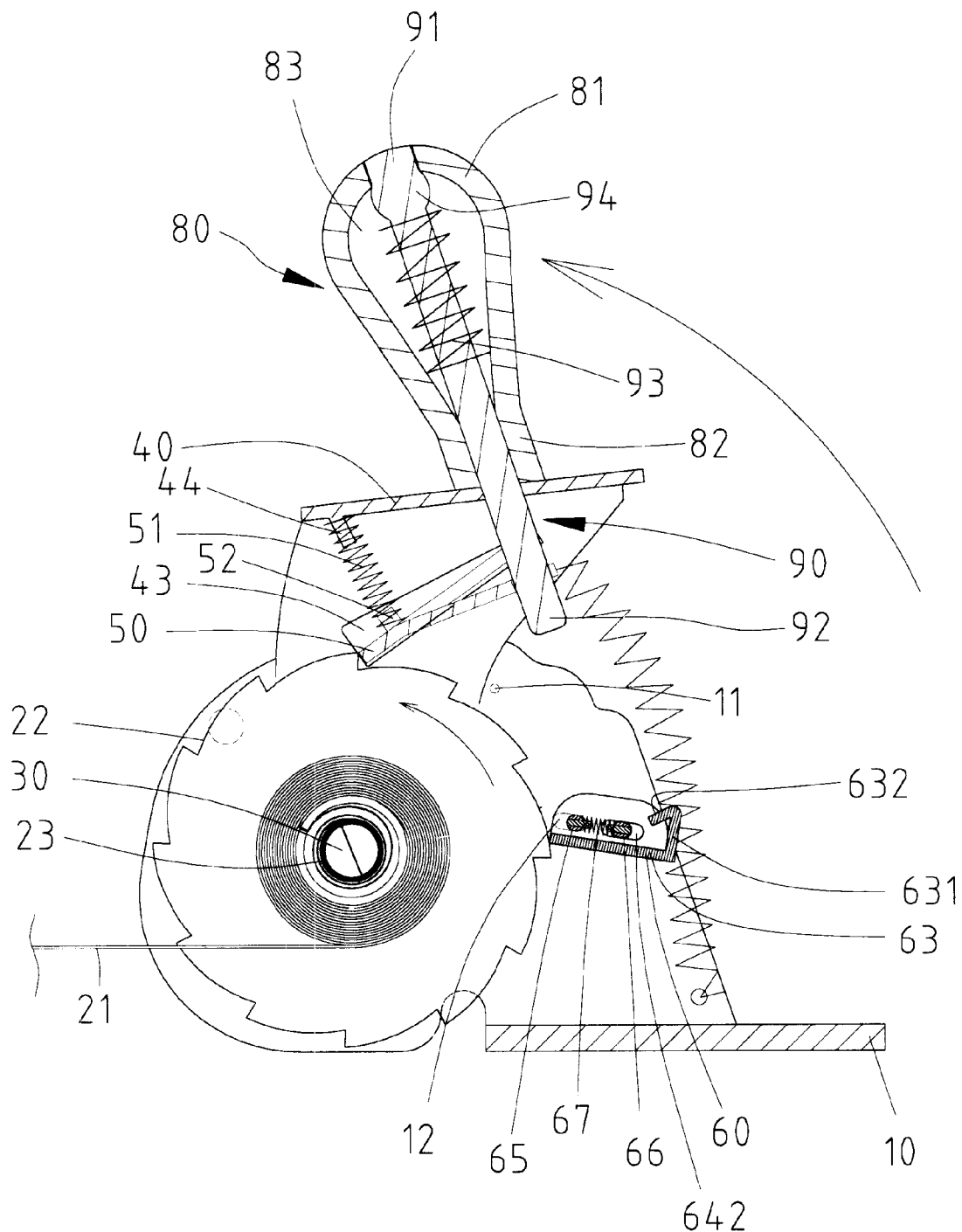
FIG. 5 is similar to FIG. 4 but showing the strap fastener in a second position.

Referring to FIG. 5, the upper end 91 of the control stick 90 is released, thus allowing the spring 67 to bias the second detent 60 into engagement with the ratchet wheels 22. A user can hold the handle 80 and pivot the lever 40 in a first direction relative to the base 10. In the beginning, the first detent 50 is kept from the ratchet wheels 22 due to the bosses 11 formed on the side plates of the base 10. However, if the user continues to pivot the lever 40 in the first direction relative to the base 10, he can have the first detent 50 engaged with the ratchet wheels 20 so that he can rotate the reel 20 in the first direction relative to the base 10 for tensioning the strap 21. On the contrary, pivotal motion of the first lever 40 in a second direction (opposite to the first direction) relative to the base 10 does not cause rotation of the reel 20 in the second direction relative to the base 10. The second detent 60 retains the ratchet wheels 22 in position when the first lever 40 is in pivotal motion in the second direction relative to the base 10.

In use of the strap fastener according to the preferred embodiment of the present invention, the user does not suffer from great pain in his fingers due to pressure because he pushes the handle 80 with his palm. Moreover, the user will not get hurt due to accidental slackening of the strap 21 because the ratchet wheels 22 cannot be disengaged from the second detent 60 unless the upper end 91 of the control stick 90 is pressed beforehand.

The present invention has been described via illustration of the preferred embodiment. After a study of this specification, those skilled in the art can derive various variations from the embodiments. Therefore, the embodiments are only taken as examples and shall not limit the scope of the present invention that is defined in the following claims.

What is claimed is:
1. A strap fastener including:
 a base,
 a shaft mounted on the base;
 a reel rotationally mounted on the shaft;
 two ratchet wheels formed on the reel;
 a torque spring arranged between the reel and the shaft;
 a lever pivotally mounted on the base;

a first detent movably mounted on the lever for engagement with the ratchet wheels;

a second detent movably mounted on the base for engagement with the ratchet wheels;

a wedge formed on the second detent;

a handle including a first end in which a hole is defined, a second end secured to the lever; and a control element extending through the handle and the lever and including a first end exposed through the hole defined in the first end of the handle and a second end in engagement with the wedge, wherein the first end of the control element can be pressed so as to move the second end of the control element from a first position for engaging the second detent with the ratchet wheels to a second position for disengaging the second detent from the ratchet wheels.

2. A strap fastener according to claim 1 wherein the control element includes an enlarged portion formed thereon near the first end for retaining the control element in the handle.

3. A strap fastener according to claim 2 including a spring received in the handle and mounted on the control element and compressed between the enlarged portion of the control element and a portion of an internal face of the handle, thus biasing the control element to the first position.

4. A strap fastener according to claim 1 wherein the wedge includes an upright portion being perpendicular thereto and an inclined portion being inclined relative thereto.

* * * * *